United States Patent
Lentz et al.

(10) Patent No.: US 6,663,362 B1
(45) Date of Patent: Dec. 16, 2003

(54) FLUID PUMP WITH A MOTOR HOUSING AND METHOD FOR PRODUCING A MOTOR HOUSING

(75) Inventors: Gerd Lentz, Buehl (DE); Christoph Heier, Iffezheim (DE); Juergen Bassler, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 09/889,897

(22) PCT Filed: Nov. 23, 2000

(86) PCT No.: PCT/DE00/04143

§ 371 (c)(1), (2), (4) Date: Oct. 31, 2001

(87) PCT Pub. No.: WO01/38741

PCT Pub. Date: May 31, 2001

(30) Foreign Application Priority Data

Nov. 24, 1999 (DE) .......................................... 199 56 380

(51) Int. Cl.[7] .......................... F04B 17/00; F04B 35/04; H02K 1/04; H02K 5/10; H01R 39/26
(52) U.S. Cl. ................ 417/423.7; 417/423.1; 417/423.14; 310/43; 310/253; 310/87
(58) Field of Search ...................... 417/423.1, 423.7, 417/423.14; 310/43, 253, 87, 49 R, 71, DIG. 6

(56) References Cited

U.S. PATENT DOCUMENTS

| | | | | |
|---|---|---|---|---|
| 3,704,078 A | * | 11/1972 | Conery et al. | ................. 310/54 |
| 4,695,419 A | | 9/1987 | Tokuzo | |
| 4,827,173 A | * | 5/1989 | Corbach et al. | ........ 310/154.26 |
| 5,234,192 A | * | 8/1993 | Kalippke et al. | ....... 251/129.11 |
| 5,291,087 A | * | 3/1994 | Pollick et al. | ................. 310/86 |
| 5,325,003 A | * | 6/1994 | Saval et al. | .................. 310/232 |
| 5,356,272 A | * | 10/1994 | Nagata et al. | ............... 417/366 |
| 5,785,013 A | * | 7/1998 | Sinn et al. | ................ 123/41.44 |
| 5,818,143 A | * | 10/1998 | Suzuki et al. | ................ 310/257 |

FOREIGN PATENT DOCUMENTS

| | | |
|---|---|---|
| DE | 37 02 028 A | 4/1988 |
| JP | 07 208380 A | 8/1995 |

\* cited by examiner

Primary Examiner—Cheryl J. Tyler
Assistant Examiner—Timothy P. Solak
(74) Attorney, Agent, or Firm—Ronald E. Greigg

(57) ABSTRACT

A fluid pump, in particular for the cooling or heating circuit of a motor vehicle, has a claw pole stator and a rotor that is separated from the claw pole stator by a tube, is immersed in a fluid, and has a vane wheel. Claws (25) of the claw pole stator (21) are an integral component of the tube (11), which is part of a motor housing (2), and the number of mounting steps is thus reduced.

20 Claims, 3 Drawing Sheets

FLUID PUMP WITH A MOTOR HOUSING AND METHOD FOR PRODUCING A MOTOR HOUSING

CROSS-REFERENCE TO RELATED APPLICATIONS

This application is a 35 USC 371 application of PCT/DE 00/04143 filed on Nov. 23, 2000.

BACKGROUND OF THE INVENTION

1. Field of the Invention

The invention is based on a fluid pump having a motor housing and on a method for producing a motor housing for a fluid pump useful, for example, as a circulating pump in a heating or cooling system of a motor vehicle.

2. Description of the Prior Art

The principle of separating the stator inverter with a tube that makes it possible to dispose the rotor in such a way that it is immersed in a coolant is known from German patent DE 37 02 028 C2.

A more-detailed description of such a fluid pump can be found in German patent disclosure DE 44 11 960 A1. The fluid pump shown in this reference has a bell-shaped rotor, whose cylindrical interior is engaged by the stator. A tubular or cup-shaped wall extends between the rotor and the stator, and a shaft about which the rotor is rotatably suspended is let into the bottom of a cup.

The anchoring of the shaft extends only a slight depth into the interior of the cylindrical hollow chamber, because almost the entire space in this chamber is required for accommodating the stator. The cylindrical wall between the stator and the rotor is very thin, for the sake of attaining a small gap width and thus low magnetic circuit losses. This impairs the stability of the suspension of the rotor.

A printed circuit board with a commutation circuit for supplying electric current to the stator can be disposed only in the axial extension of the stator, which thus increases the installation depth of the fluid pump.

German patent application 199 34 382 has also proposed using a fluid pump with a motor that has a claw pole stator. This claw pole stator comprises a winding and two claw baffles with claws. The individual parts have to be assembled in a plurality of assembly steps and fixed on the motor housing. Because of tolerance, an air gap is created between the claw pole stator and the motor housing, which makes it more difficult to dissipate a heat loss from the winding to a medium pumped in the fluid pump and makes it harder to achieve low magnetic circuit losses.

SUMMARY OF THE INVENTION

The fluid pump of the invention having a motor housing, and the method for producing a motor housing for a fluid pump, have the advantage over the prior art that the operating properties are improved and the number of assembly steps is reduced, both in a simple way.

By injecting claw baffles, the advantages obtained, because of heat transfer without an air gap, that a heat loss from a winding and claws can be better dissipated to a fluid flowing in a tube.

It is especially advantageous to inject or mold the claws or claw baffles into a motor housing, since as a result fewer parts have to be assembled. It is advantageous to inject metal connecting parts into the motor housing, since once again the installation in the motor housing is made unnecessary, and a passage through the connecting parts is simultaneously well sealed off.

It is also advantageous to inject a stamped grid into the motor housing; the stamped grid makes an electrical connection from and to a printed circuit board, and as a result it is no longer necessary for electrical connecting lines to be put in place and secured.

It is advantageous to spray-coat the claw pole stator in such a way that heat radiation from the winding in the region of the at least one printed circuit board is reduced, since this improves the service life and operating conditions of the printed circuit board.

It is advantageous for the winding to be wound directly onto the motor housing, because then no additional winding holder has to be used.

A short-circuit ring is advantageously mounted on the motor housing.

BRIEF DESCRIPTION OF THE DRAWINGS

The foregoing and other advantages and features of the invention will become apparent from the detailed description contained below, taken with the drawings, in which.

DESCRIPTION OF THE PREFERRED EMBODIMENT

Figure 1:
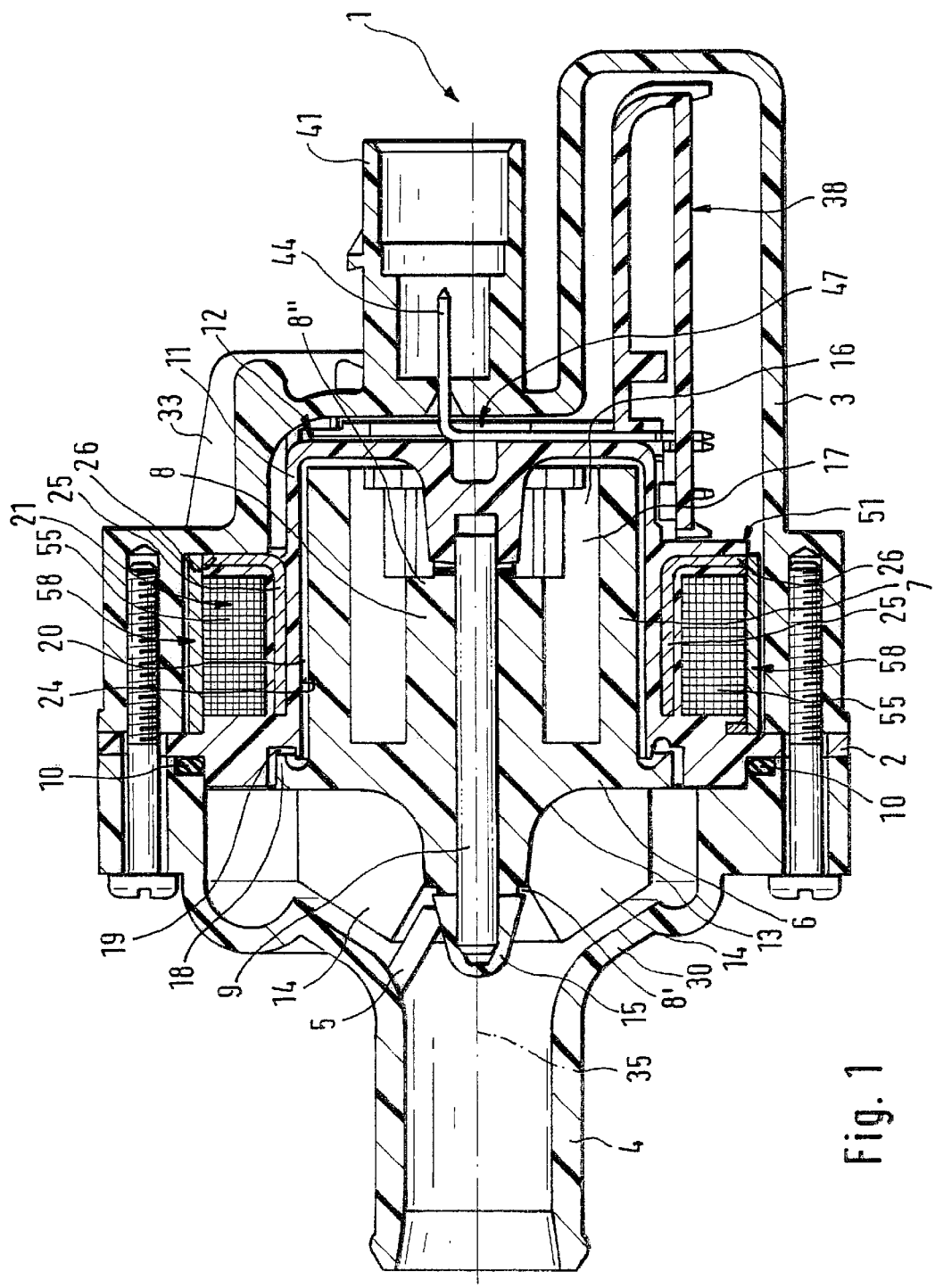
FIG. 1 shows an axial section through a fluid pump of the invention.

The fluid pump 1 can be used for instance as a coolant pump or for a heating circuit in a motor vehicle and has a three-piece pump housing 33, which comprises a front housing part 30 with an intake stub 4 embodied in it and with a compression stub, not shown, a motor housing 2, and a rear housing part 3. The front housing part 30, intake stub 4, motor housing 2 and rear housing part 3 are all of plastic, but the intake stub 4 and the rear housing part 3 can also be of some other material, such as metal or ceramic.

The parts 30, 2, 3 are held together by screws, for instance, that keep the motor housing 2 fastened between the front part 30 and rear part 3. Any other type of connection is also possible, such as rivets and adhesive bonding. A sealing ring 10 is clamped or injected between the front housing part 30 and the motor housing 2. The motor housing 2 comprises a nonmagnetic material and has a thin-walled portion, in the form of a tube 11 with an inner wall 24. A rotor 6 is accommodated in the tube 11, which together with a bottom 12 forms a cup.

The rotor 6 is of a plastic-bonded magnetic material, for instance powdered magnetic material embedded in a synthetic resin or plastic matrix, is produced in one piece, for instance by injection molding, and includes an outer cylinder 7 that with slight spacing follows the course of the tube 11. The rotor 6 is magnetized with two poles or more, depending on the intended use. The rotor 6 rotates about a pivot axis 35, which also represents a center line of the rotor 6. The outer cylinder 7, on its end toward the intake stub 4, is closed by an end wall 13 that carries a plurality of vanes 14.

A bearing shaft 8 joined integrally to the end wall 13 extends through the interior of the cylinder 7. The bearing shaft 8, at least on its two axial ends 8', 8", is supported rotatably about a stationary shaft 9 and surrounds it over essentially the entire length of the stationary shaft. The length of the bearing shaft is as least so great that the center of gravity of the rotor 6 is located between the two ends 8', 8". The shaft 9 is anchored in a manner fixed against relative rotation by knurling on a first end in a recess of the bottom 12, while its second end is received in hub 15 of a ribbed star embodied integrally with the front housing part 30, of which only one strut 5 is shown in FIG. 1.

To keep the weight of the rotor 6 low, an annular chamber 16 is provided between the outer cylinder 7 and the bearing shaft 8; except for a few thin-walled ribs 17, the annular chamber is empty. The ribs 17 serve to reinforce the connection between the outer cylinder 7 and the bearing shaft 8.

An encompassing flange 18 is disposed at the transition between the outer cylinder 7 and the end wall 13 of the rotor and engages an annular groove 19 of the motor housing 2, to prevent the entry of solid contaminants from the coolant flow into the narrow gap 20 between the outer cylinder and the tube 11.

A claw pole stator 21 extends around the tube 11. At least in part, claw baffles 26 of the claw pole stator 21 with claws 25 are an integral part of the motor housing 2. For instance, the claw baffles 26 are disposed in the tube 11. One way to proceed with integral disposition is achieved by providing that the claws 25 or claw baffles 26 are injected at least partly into the plastic motor housing 2. Another way is made possible by hot-embedding of the claws 25 or claw baffles 26 in the plasticized plastic of the motor housing 2. Other ways of proceeding are also possible.

Located around the claws 25 is a winding 55, which in turn is surrounded by a short-circuit ring 58. The winding 55 is wound for instance directly onto the insulating motor housing 2. However, the winding 55 can also be disposed as a prefabricated part on the motor housing 2. A winding holder is then not necessary.

A supply circuit for the claw pole stator 21 can be mounted for instance on a printed circuit board 38, which for instance is annular in shape; as a result, it does not increase the axial structure length of the fluid pump 1. The printed circuit board 38 extends approximately parallel to the pivot axis 35 and is accommodated for instance in the rear housing part 3. Also located there is a connection point 41 with at least one metal connecting part 44, which is for instance one part of a stamped grid 47. The stamped grid 47 connects an external plug to connecting point 41 for instance to the printed circuit board 38. The printed circuit board 38 is separated from the winding 55 by a radial protective wall 51, which for instance is injected directly, so that heat radiation of a heat loss from the winding 55 and the claws 25 toward the printed circuit board 38 is reduced. Other ways of fastening the protective wall 51 in the motor housing are also possible.

The claws 25 are injected into the motor housing 2, for instance, and in the same operation the metal connecting parts 44 are injected for instance as stamped grids 47 on the outside and toward the printed circuit board 38. The stamped grid 47 can for instance also be injected into the rear housing part 3, which is produced in a separate operation.

A winding 55 is then wound around the claws 55. A short-circuit ring 58 is then installed.

Figure 2:
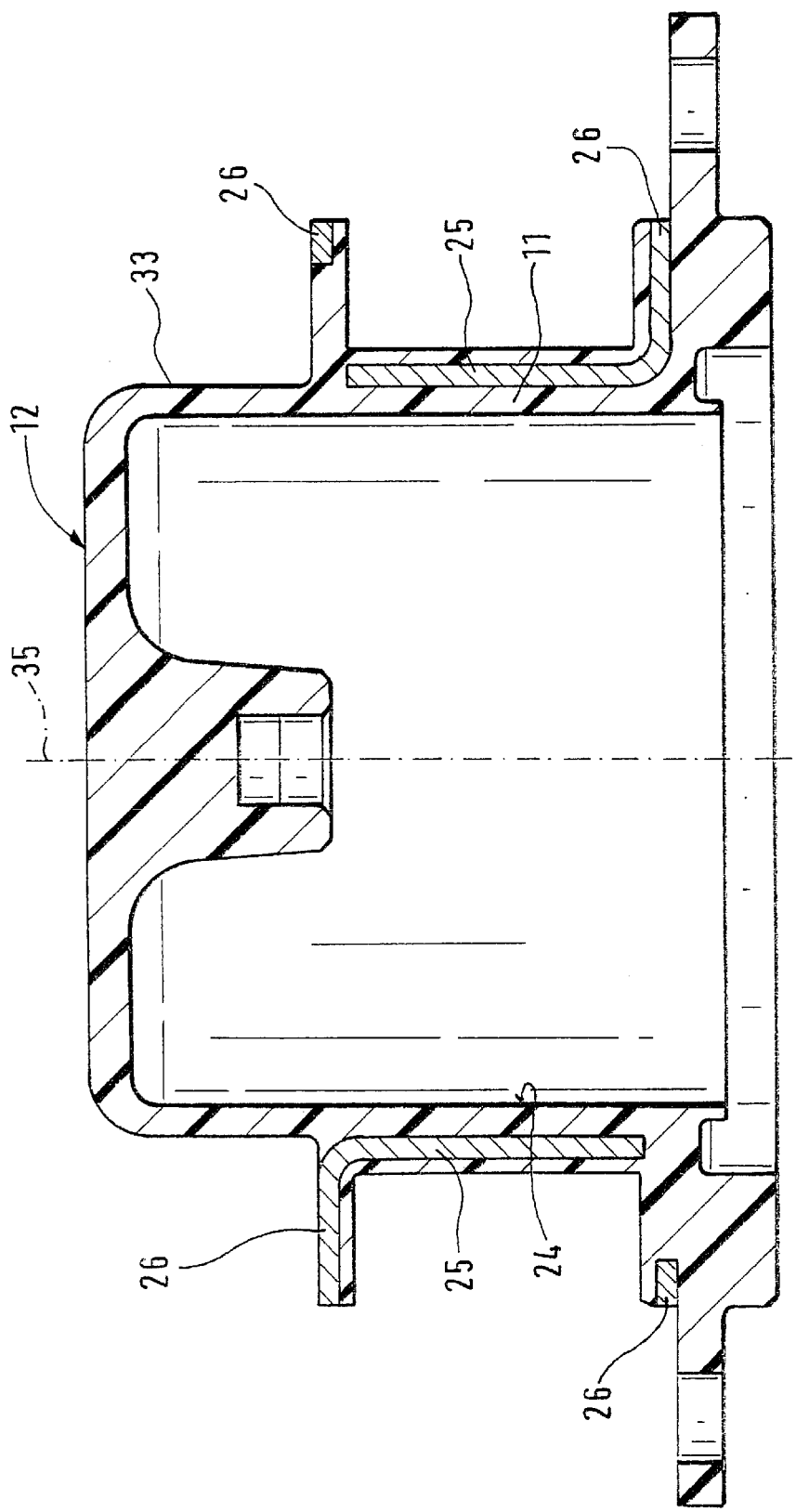
FIG. 2 shows an axial section through the motor housing with claw poles.

A magnetic field generated by the winding 55, with alternating polarity of the claws 25 of the two claw baffles 26, reaches radially inward and thus drives the rotor 6, which is not shown in FIG. 2. The winding 55 is designed in bifilar fashion; that is, it includes two circuits that can be acted upon separately and independently of one another by an electric current. This makes it possible to generate magnetic fields with alternating polarity. Such a claw pole stator 21 can be operated with simpler power electronics than a unifilar design.

A Hall sensor, not shown, assures commutation, for instance, and can be provided as a magnetic field sensor for monitoring the function or speed of the fluid pump 1, at a location where the sensor is exposed to the varying magnetic field of the rotating rotor 6.

FIG. 2 shows an axial cross section through the motor housing 2 and the claw baffles 26 with the claws 25. For the same parts or parts functioning the same, the same reference numerals as in FIG. 1 are used.

The integral disposition of the claws 25 in the motor housing makes it possible to keep a spacing between the claws 25 and the inner wall 24 and thus a spacing from the cylinder 7 of the rotor 6 very slight, and thus makes it possible to increase an exertion of force between the claw pole stator 21 and the rotor 6.

The heat input of the heat loss of the winding 55 and of the claws into the fluid is also enhanced and thus the cooling is improved, so that the operating temperature and radiation in the direction of the printed circuit board 38 are lowered.

Figure 3:
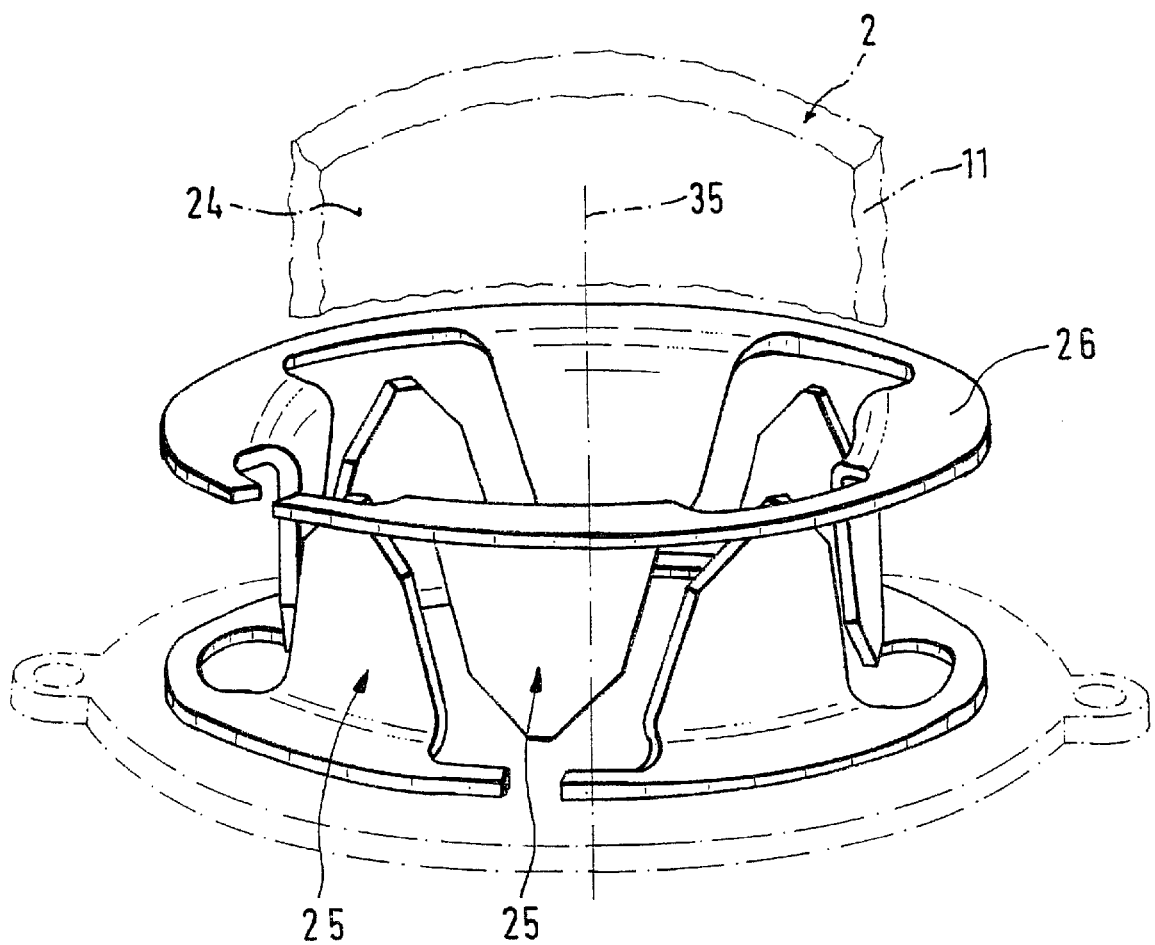
FIG. 3 is a three-dimensional view of claws injected into the motor housing.

FIG. 3 shows a three-dimensional view of claws 25, which are an integral component of the motor housing 2. The same reference numerals as in the other drawings are used for the same parts or parts that function the same. Only part of the motor housing 2 is shown, in dashed lines.

The claw pole stator 21 includes two claw baffles 26, each designed identically, with an encompassing outer ring and a plurality of claws 25 on each claw baffle 26, which claws are bent radially inward, beginning at one edge of the claw baffle 26, and are then bent in the direction of the opposite edge. The claws 26 extend in the axial direction, tapering trapezoidally, for instance. This improves the efficiency of the motor. The claw baffles 26 are inter-nested in one another in such a way that the claws 25 of one claw baffle 26 protrude into gaps between claws 25 of the other claw baffle 26, in each case with spacing in the circumferential direction, and the radially extending edges of the claw baffles are spaced apart from one another axially.

In the interior toward the inner wall 24, the claws 25 are covered completely by the plastic of the tube 11. Farther outward in the radial direction, the claws 25 are also surrounded by plastic, for instance. However, they can also be exposed there.

The claw baffles 26 form an annular hollow chamber into which the winding 55 is wound, for instance.

The foregoing relates to preferred exemplary embodiments of the invention, it being understood that other variants and embodiments thereof are possible within the spirit and scope of the invention, the latter being defined by the appended claims.

We claim:

1. A fluid pump (1) comprising a motor housing (2), a claw pole stator (21), and an inner rotor (6) that is separated from the claw pole stator (21) by a tube (11) and is immersed into the fluid to be pumped, and at least one vane wheel,
   said motor housing (2) being of plastic, and
   said claw pole stator (21) having claw baffles (26), wherein at least part of the claw pole stator (21) is retained in the motor housing (2) by injection molding.

2. The fluid pump of claim 1, wherein
   the claw baffles (26) are retained at least partly in the motor housing (2) by injection molding.

3. The fluid pump of claim 2, further including
a pump housing (33) of the fluid pump (1) which includes a rear housing part (3), and
metal connecting parts (44) are retained in the motor housing (2) or the rear housing part (3) by injection molding, and make an electrical connection between an interior and an exterior of the motor housing (2).

4. The fluid pump of claim 1, wherein
a pump housing (33) of the fluid pump (1) comprises a rear housing part (3), and
metal connecting parts (44) are retained in the motor housing (2) or the rear housing part (3) by injection molding so as to make an electrical connection between an interior and an exterior of the motor housing (2).

5. The fluid pump of claim 4, wherein
the fluid pump (1) further comprises at least (1) printed circuit board (38) for mounting electronic components for a controller, and
at least one stamped grid (47) for an electrical connection from and to the at least one printed circuit board (38) is retained in the motor housing (2) or into the rear housing part (3) by injection molding.

6. A fluid pump (1) comprising a motor housing (2), a claw pole stator (21), and an inner rotor (6) that is separated from the claw pole stator (21) by a tube (11) and is immersed into the fluid to be pumped, and at least one vane wheel,
said motor housing (2) being of plastic, and
said claw pole stator (21) having claw baffles (26), wherein at least part of the claw pole stator (21) is retained in the motor housing (2) by injection molding;
wherein the claw pole stator (21) includes a winding (55) and claws (25), and
the claws (25) extend to the vicinity of an inner wall (24) of the tube (11), so that heat from the winding (55) and claws (25) can be dissipated to the fluid flowing in the tube (11).

7. The fluid pump of claim 6, wherein
the motor housing (2) has a protective wall (51) which is designed such that it reduces heat radiation from the winding (55) of the claw pole stator (21) to the at least one printed circuit board (38).

8. The fluid pump of claim 7, wherein a short-circuit ring (58) is mounted on the motor housing (2) in the region of the winding (55).

9. The fluid pump of claim 7, wherein the winding (55) is wound directly onto the motor housing (2).

10. The fluid pump of claim 9, wherein a short-circuit ring (58) is mounted on the motor housing (2) in the region of the winding (55).

11. The fluid pump of claim 6, wherein
the winding (55) is wound directly onto the motor housing (2).

12. The fluid pump of claim 11, wherein a short-circuit ring (58) is mounted on the motor housing (2) in the region of the winding (55).

13. The fluid pump of claim 6, wherein
a short-circuit ring (58) is mounted on the motor housing (2) in the region of the winding (55).

14. A fluid pump (1) comprising a motor housing (2), a claw pole stator (21), and an inner rotor (6) that is separated from the claw pole stator (21) by a tube (11) and is immersed into the fluid to be pumped, and at least one vane wheel,
said motor housing (2) being of plastic, and
said claw pole stator (21) having claw baffles (26), wherein at least part of the claw pole stator (21) is retained in the motor housing (2) by injection molding; wherein further
the claw baffles (26) are retained at least partly in the motor housing (2) by injection molding; wherein
the claw pole stator (21) includes a winding (55) and claws (25), and
the claws (25) extend to the vicinity of an inner wall (24) of the tube (11), so that heat from the winding (55) and claws (25) can be dissipated to the fluid flowing in the tube (11).

15. A fluid pump (1) comprising a motor housing (2), a claw pole stator (21), and an inner rotor (6) that is separated from the claw pole stator (21) by a tube (11) and is immersed into the fluid to be pumped, and at least one vane wheel,
said motor housing (2) being of plastic, and
said claw pole stator (21) having claw baffles (26), wherein at least part of the claw pole stator (21) is retained in the motor housing (2) by injection molding;
a pump housing (33) of the fluid pump (1) comprises a rear housing part (3), and
metal connecting parts (44) are retained in the motor housing (2) or the rear housing part (3) by injection molding so as to make an electrical connection between an interior and an exterior of the motor housing (2); wherein
the claw pole stator (21) includes a winding (55) and claws (25), and
the claws (25) extend to the vicinity of an inner wall (24) of the tube (11), so that heat from the winding (55) and claws (25) can be dissipated to the fluid flowing in the tube (11).

16. The fluid pump of claim 15, wherein
the motor housing (2) has a protective wall (51) which is designed such that it reduces heat radiation from the winding (55) of the claw pole stator (21) to the at least one printed circuit board (38).

17. The fluid pump of claim 15, wherein a short-circuit ring (58) is mounted on the motor housing (2) in the region of the winding (55).

18. A fluid pump (1) comprising a motor housing (2), a claw pole stator (21), and an inner rotor (6) that is separated from the claw pole stator (21) by a tube (11) and is immersed into the fluid to be pumped, and at least one vane wheel,
said motor housing (2) being of plastic, and
said claw pole stator (21) having claw baffles (26), wherein at least part of the claw pole stator (21) is retained in the motor housing (2) by injection molding;
a pump housing (33) of the fluid pump (1) comprises a rear housing part (3), and
metal connecting parts (44) are retained in the motor housing (2) or the rear housing part (3) by injection molding so as to make an electrical connection between an interior and an exterior of the motor housing (2);
the fluid pump (1) further comprises at least (1) printed circuit board (38) for mounting electronic components for a controller, and
at least one stamped grid (47) for an electrical connection from and to the at least one printed circuit board (38) is retained in the motor housing (2) or into the rear housing part (3) by injection molding; wherein
the claw pole stator (21) includes a winding (55) and claws (25), and
the claws (25) extend to the vicinity of an inner wall (24) of the tube (11), so that heat from the winding (55) and claws (25) can be dissipated to the fluid flowing in the tube (11).

19. A method for producing a motor housing (2) for a fluid pump (1) wherein the fluid pump (1) has a claw pole stator (21) and an inner rotor (6), separated from the claw pole stator (21) by a tube (11) and immersed in the fluid and having a vane wheel, the method comprising the steps of:

injection molding said motor housing primarily from plastic material so that the motor housing (2) includes claw baffles (26) that have claws (25), metal connecting parts (44), and at least one stamped grid (47) integrally joined with the plastic motor housing (2), then winding a winding (55) onto the motor housing (2) in the region of the claws (25), and then mounting a short-circuit ring (58) over the winding (55).

20. A method for producing a motor housing (2) for a fluid pump (1) wherein the fluid pump (1) has a claw pole stator (21) and an inner rotor (6), separated from the claw pole stator (21) by a tube (11) and immersed in the fluid and having a vane wheel, the method comprising the steps of:

injection molding said motor housing primarily from plastic material, so that the motor housing (2) includes claw baffles (26) that have claws (25), metal connecting parts (44), and at least one stamped grid (47) integrally joined with the plastic motor housing (2), then placing a winding (55) in the motor housing (2) in the region of the claws (25), and then mounting a short-circuit ring (58) over the winding (55).

* * * * *